(12) United States Patent  
Miyata et al.

(10) Patent No.: US 8,435,686 B2
(45) Date of Patent: May 7, 2013

(54) FUEL CELL SYSTEM

(75) Inventors: Koichiro Miyata, Saitama (JP); Chihiro Wake, Saitama (JP); Jumpei Ogawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 599 days.

(21) Appl. No.: 12/128,496

(22) Filed: May 28, 2008

(65) Prior Publication Data

US 2008/0299428 A1    Dec. 4, 2008

(30) Foreign Application Priority Data

Jun. 1, 2007 (JP) ................. 2007-147422

(51) Int. Cl.
*H01M 8/04* (2006.01)
(52) U.S. Cl.
USPC ........... 429/432; 429/428; 429/429; 429/430; 429/431
(58) Field of Classification Search ............ 429/24, 429/428, 429, 430, 431, 432
See application file for complete search history.

(56) References Cited

U.S. PATENT DOCUMENTS

| | | | |
|---|---|---|---|
| 5,798,186 A * | 8/1998 | Fletcher et al. | 429/429 |
| 2002/0182461 A1 * | 12/2002 | Hasuka et al. | 429/23 |
| 2002/0189872 A1 * | 12/2002 | Hasuka et al. | 180/65.3 |

FOREIGN PATENT DOCUMENTS

| | | | |
|---|---|---|---|
| JP | 07272736 A | * | 10/1995 |
| JP | 9-55219 | | 2/1997 |
| JP | 2004-172055 A | | 6/2004 |
| JP | 2006092834 A | * | 4/2006 |

OTHER PUBLICATIONS

Machine translation of JP 07272736 A, Kiriki et al., Oct. 1995.*
Jinba et al., Machine translation of JP 2006-092834 A, Apr. 2006.*
Japanese Office Action for Application No. 2007-147422, 2 pages, dated Jul. 3, 2012.

* cited by examiner

*Primary Examiner* — Basia Ridley
*Assistant Examiner* — Sean P Cullen
(74) *Attorney, Agent, or Firm* — Nelson Mullins Riley & Scarborough LLP; Anthony A. Laurentano

(57) ABSTRACT

A fuel cell system is provided that can suppress the degradation of the MEA and simultaneously assure the merchantability. The fuel cell system 1 includes: a fuel cell 10 that generates electric power by reacting hydrogen gas and oxidant gas; a temperature sensor 103 that detects the temperature of the fuel cell 10; a voltage lower limit calculation portion 31 that sets the voltage threshold to limit the output of the fuel cell 10 based on the temperature detected of the fuel cell 10; a current upper limit calculation portion 32 and the current limiting portion 33 that limits the output of the fuel cell in a case where the voltage generated by the fuel cell 10 is lower than the voltage threshold.

8 Claims, 6 Drawing Sheets

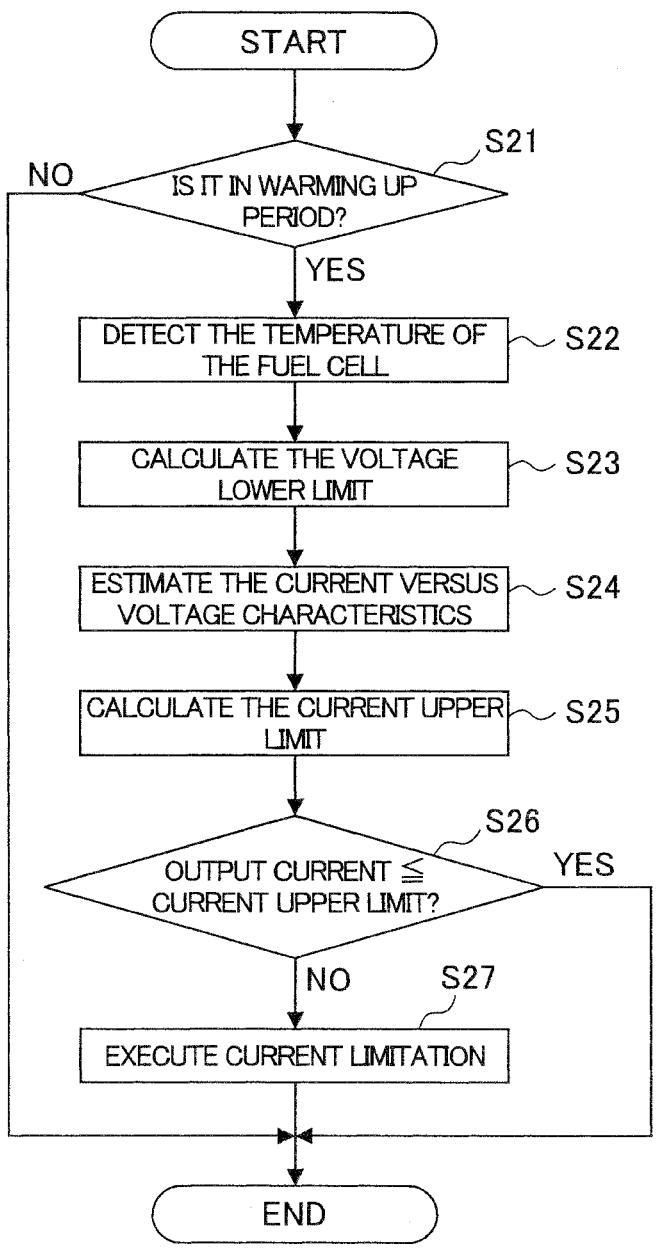

FUEL CELL SYSTEM

This application is based on and claims the benefit of priority from Japanese Patent Application No. 2007-147422, filed on 1 Jun. 2007, the content of which is incorporated herein by reference.

BACKGROUND OF THE INVENTION

1. Field of the Invention

This invention relates to a fuel cell system. In particular, it relates to a fuel cell system mounted to an automobile.

2. Related Art

Recently, fuel cell systems have drawn attention as a new power source for automobiles. The fuel cell system includes, for example, a fuel cell that generates electric power by chemically reacting reactant gas, a reactant gas supplying device that supplies a reactant gas to the fuel cell via the reactant gas channel and a control device that controls the reactant gas supplying device.

The fuel cell has, for example, a stack structure in which several tens to several hundreds of cell are laminated. Each cell is configured by sandwiching a membrane electrode assembly (MEA) by a pair of plates. The membrane electrode assembly is configured by an anode and a cathode and a polymer electrolyte membrane which is arranged between the two electrodes.

The electric power generation occurs as the result of an electrochemical reaction by supplying hydrogen gas as the reactant gas to the anode and air including oxygen (oxidant gas) as the reactant gas to the cathode.

Incidentally, it is known that when cell voltage decreases to a value lower than a specified value (called voltage lower limit herein after), it is in a degradation range in which the degradation of MEA is accelerated. To solve the problem, for example, a system is proposed to suppress the voltage decrease by limiting current and power output, etc. (see Japanese Patent application publication 2004-172055 A, hereinafter referred to as Patent Document 1).

More specifically, in the system disclosed in Patent Document 1, the threshold value A and the threshold value B, which is lower than the threshold value A, are set for the cell voltage, and when the lowest cell voltage is lower than the threshold value A, the output is limited in order for the lowest cell voltage not to become lower than the threshold value B. Furthermore, when the lowest cell voltage becomes lower than the threshold value B, the output is farther limited according to the variation of the lowest cell.

However, it has been confirmed that the voltage lower limit varies according to fuel cell temperature. Especially in the low temperature range, there is a tendency for the voltage lower limit to be higher, the lower the temperature becomes. However, the threshold value of the voltage lower limit that is disclosed by the Patent Document 1 does not depend on the temperature of the fuel cell and was constant.

Therefore, for example, when the fuel cell is driven in the lower temperature state, the voltage lower limit becomes higher than the specified threshold value and there is a danger of entering the degradation range, despite the cell voltage being higher than the threshold value. When the threshold value is set high, the voltage lower limit may become largely lower than the threshold value so that the MEA is protected excessively, thereby degrading the drivability.

As described above, it was difficult to keep the compatibility between the merchantability and the protection of the MEA.

SUMMARY OF THE INVENTION

The object of the present invention is to provide a fuel cell system that can suppress the degradation of the MEA and at the same time assure the merchantability.

The fuel cell system of the present invention is characterized in that it includes: a fuel cell that generates electric power by reacting hydrogen gas and oxidant gas (for example, the fuel cell 10 as described later); a temperature detection means for detecting a temperature of the fuel cell (for example, the temperature sensor 103 as described later); a threshold setting means for setting a voltage threshold value to limit output of the fuel cell based on the temperature detected of the fuel cell (for example, the voltage lower limit calculation portion 31 as described later); an output limiting means for limiting the output of the fuel cell in a case where generated voltage by the fuel cell is lower than the voltage threshold value (for example, the current upper limit calculation portion 32 and the current limiting portion 33 as described later).

According to the present invention, the voltage threshold value is set based on the fuel cell temperature. The output of the current and the power, etc. of the fuel cell is limited by this voltage threshold value. Therefore, as the voltage threshold value is set according to the temperature characteristics related to MEA degradation, the performance degradation of the fuel cell by the excessive limitation of the output can be avoided. As a result, the discomfort arising from degradation in drivability can be avoided and the merchantability can be assured.

Moreover, as the voltage threshold value is set based on the fuel cell temperature, the cell voltage entering into the MEA degradation range can be avoided even in a case where the fuel cell temperature changes.

In this case, it is preferable that the output limiting means determines an output limiting value of the fuel cell based on the voltage threshold value that is set by the threshold value setting means and current versus voltage characteristics showing a relation between the generated current and the generated voltage by the fuel cell.

According to the present invention, the output limiting value is determined by the voltage threshold value according to current versus voltage characteristics showing the relation between the generated current and the generated voltage so that the output limiting value can be reliably determined.

The fuel cell system of the present invention is characterized in that it includes: a fuel cell that generates electric power by reacting hydrogen gas and oxidant gas (for example, the fuel cell 10 as described later); a temperature detection means for detecting a temperature of the fuel cell (for example, the temperature sensor 103 as described later); a threshold value setting means for setting a current threshold value to limit output of the fuel cell based on the temperature detected of the fuel cell (for example, the lower limit voltage calculation portion 31 and the current upper limit calculation portion 32 as described later); and an output limiting means for limiting the output of the fuel cell in a case where generated current by the fuel cell is higher than the current threshold value (for example, the current limiting portion 33 as described later).

According to the present invention, the fuel cell system sets the current threshold value based on the fuel cell temperature and limits the output of the current and the power, etc. of the fuel cell by this current threshold value. As is described, by setting the current threshold value according to the temperature characteristics related to the MEA degradation, a similar effect can be expected as described above.

In this case, it is preferable that the threshold value setting means determines the current threshold value based on a voltage threshold value for limiting the output dependent on the temperature of the fuel cell and current versus voltage characteristics showing a relation between the generated current and the generated voltage of the fuel cell.

According to the present invention, the fuel cell system determines the current threshold value from the voltage threshold value according to the current versus voltage characteristics. Accordingly, the output limiting means can determine output limiting timing by measuring the current and monitoring its variation. In addition, the output limiting value can be determined based on this current threshold value.

In the fuel cell system of the present invention, it is preferable that the threshold value setting means makes setting for limiting the output during a warming up period of the fuel cell.

According to the present invention, the fuel cell system sets the voltage threshold value or current threshold value in the low temperature range in which the voltage condition becomes severe to suppress the MEA degradation such as while warming up. Here, as the temperature characteristics related to the MEA degradation and the current versus voltage characteristics become stable in the temperature range after the warming up period, it is no longer necessary to set the threshold value according to the temperature, and then a constant output limit can be executed. Consequently, according to the present invention, after the warming up period, the load can be reduced of processing the output limitation.

According to the present invention, the voltage threshold value or the current threshold value is set based on the fuel cell temperature, and the output of the current and the power, etc. of the fuel cell are limited by this threshold value. Accordingly, even with the variation of the fuel cell temperature, MEA degradation can be suppressed by assuring, at the same time, the merchantability of the fuel cell system.

BRIEF DESCRIPTION OF THE DRAWINGS

FIG. 6 is a flow chart showing operation of the fuel system related to the second embodiment.

DETAILED DESCRIPTION OF THE INVENTION

Figure 1:
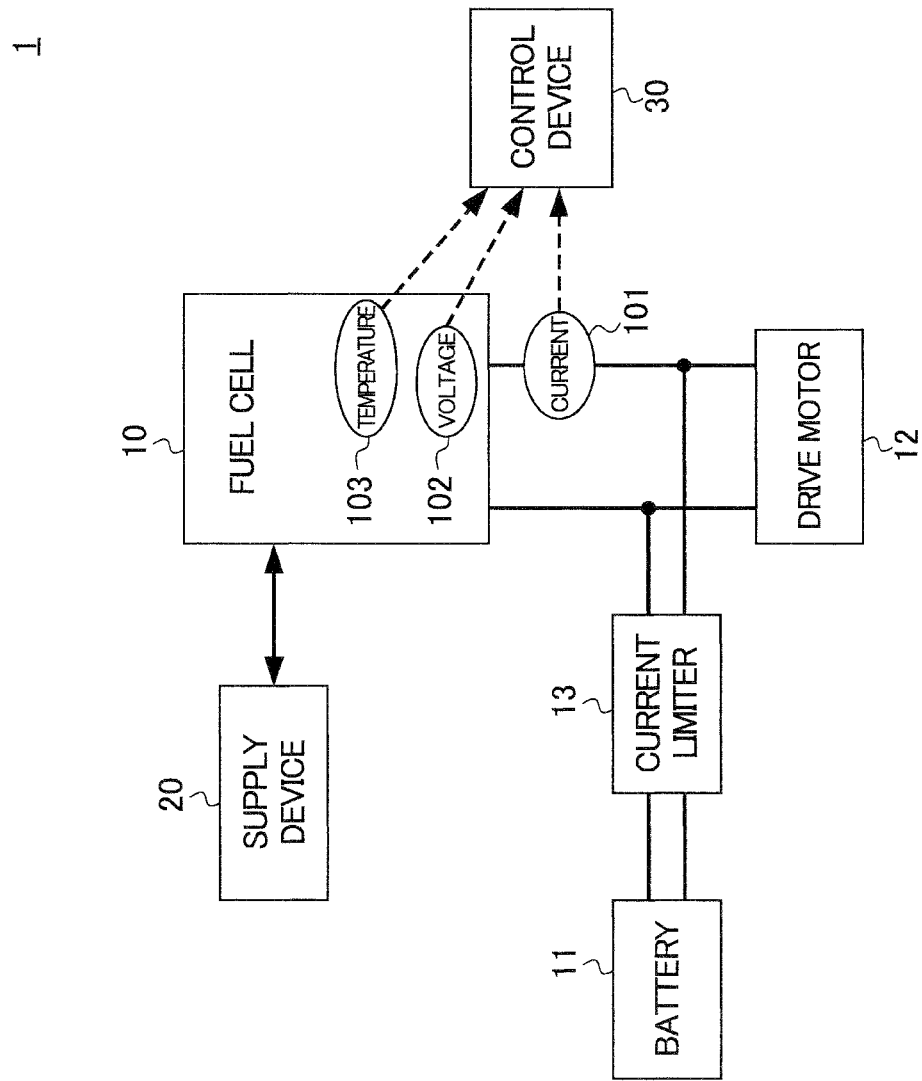
FIG. 1 is a block diagram of a fuel cell system of the first embodiment of the present invention.

Hereafter, preferred embodiments of the present invention are described based on the figures.
The First Embodiment
FIG. 1 shows a block diagram of a fuel cell system 1 of the first embodiment of the present invention. The fuel cell system 1 includes a fuel cell 10 that generates electric power by reacting hydrogen gas and air (oxidant gas) as reactant gas; a supply device 20 that supplies the hydrogen gas and the air to the fuel cell 10; a battery 11 as a storage means that can store the electric power; and a control device 30 that controls the fuel cell 10, the supply device 20 and the battery 11. Among these, the battery 11 and the fuel cell 10 are connected to a drive motor 12 that drives the fuel cell electric vehicle.

The fuel cell 10 generates electric power by the electrochemical reaction when the hydrogen gas is supplied to the anode (positive electrode) and the air, which includes oxygen, is supplied to the cathode (negative electrode).

The fuel cell 10 is connected to the battery 11 via a current limiter 13 and the drive motor 12. In addition, in the fuel cell 10, a current sensor 101 that detects a current value generated by the fuel cell 10, a voltage sensor 102 that detects a cell voltage of the fuel cell 10, and a temperature sensor 103 as a temperature detection means for detecting a temperature of the fuel cell 10 are provided.

The electric power that is generated by the fuel cell 10 is supplied to the battery 11 and the drive motor 12. The current limiter 13 limits the output power of the fuel cell 10 according to the requirement and supplies the power to the drive motor 12 and the battery 11.

The battery 11 stores the electric power that is generated by the fuel cell 10 in a case where the voltage of the battery 11 is lower than that of an output voltage of the fuel cell 10. On the other hand, the battery 11 supplies the power to the drive motor 12 according to the requirement to assist the drive of the drive motor 12.

The above described battery 11, the drive motor 12, the current limiter 13 and the supply device 20 are controlled by the control device 30. In addition, the current sensor 101, the voltage sensor 102 and the temperature sensor 103 are connected to the control device 30.

Figure 2:
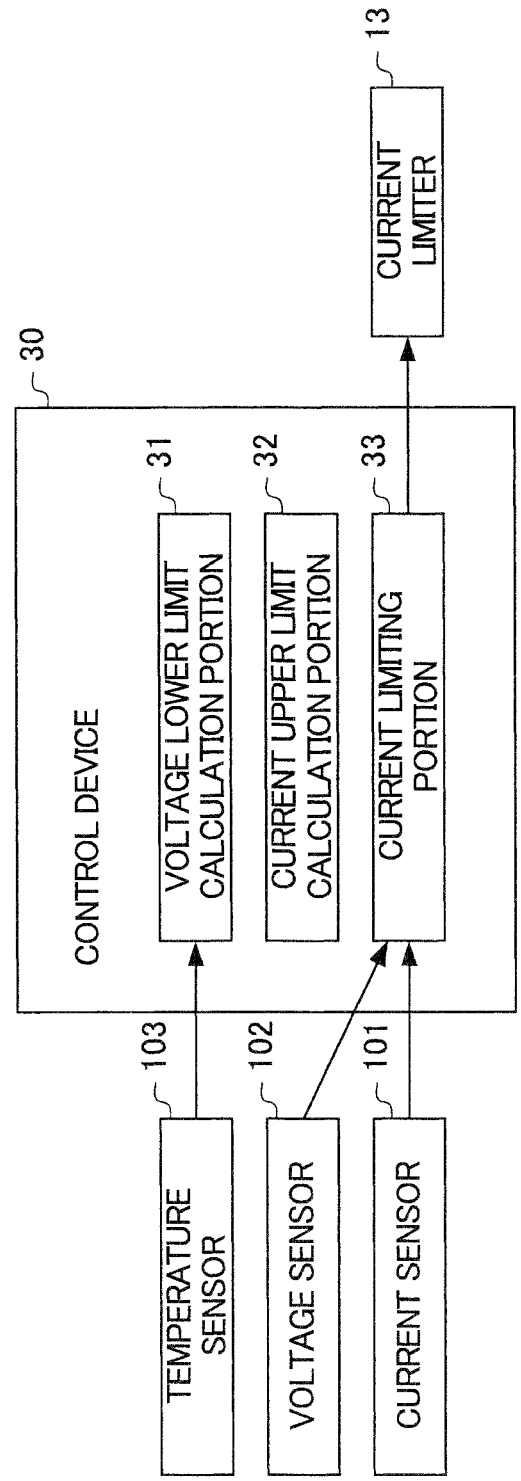
FIG. 2 is a block diagram of the control device of the fuel cell system related to the embodiment.

FIG. 2 is a block diagram of the control device 30. The control device 30 includes a voltage lower limit calculation portion 31 as a threshold setting means, a current upper limit calculation portion 32 as an output limiting means and a current limiting portion 33.

Figure 3:
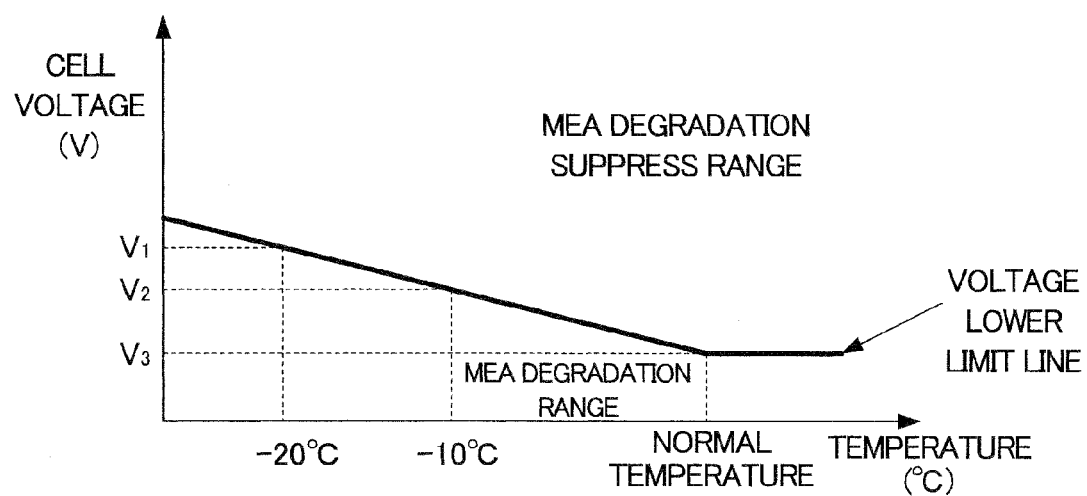
FIG. 3 is a diagram showing the relation between the temperature and the voltage lower limit of the fuel cell in relation to the embodiment.

The voltage lower limit calculation portion 31 calculates a voltage lower limit as the voltage threshold in order to limit the output of the fuel cell 10 based on the temperature of the fuel cell 10 that is detected by the temperature sensor 103 according to FIG. 3.

FIG. 3 shows a relation between the temperature of the fuel cell 10 and the voltage lower limit. The voltage lower limit decreases when the temperature increases in the range in which the temperature of the fuel cell 10 changes from the lower temperature range to a normal temperature, and the voltage lower limit becomes constant when the temperature of the fuel cell 10 is equal to or higher than the normal temperature. Furthermore, in a case where the cell voltage of the fuel cell 10 is equal to or higher than the voltage lower limit, the fuel cell is in the MEA degradation suppressed range in which MEA degradation is suppressed, and in a case where the cell voltage of the fuel cell 10 becomes lower than the voltage lower limit, it enters into the MEA degradation range in which MEA degradation is promoted.

For example, in a case where the temperature of the fuel cell 10 is minus 20° C., the voltage lower limit becomes V1 and in a case in where the temperature of the fuel cell 10 is 10° C., the voltage lower limit becomes V2. In addition, in a case where the temperature of the fuel cell 10 is equal to or higher than the normal temperature, the voltage lower limit becomes V3 and constant. As described above, in a case where the temperature of the fuel cell 10 is equal to or lower than the normal temperature, the lower the temperature is, the higher the voltage lower limit becomes.

The current upper limit calculation portion 32 determines current versus voltage characteristics showing a relation between a generated output current and the fuel cell voltage based on the detected temperature of the fuel cell 10 by the temperature sensor 103. Furthermore, a current upper limit is calculated as an output limiting value of the fuel cell 10 based on the voltage lower limit that is calculated by the voltage lower limit calculation portion 31, and the determined current versus voltage characteristics.

Figure 4:
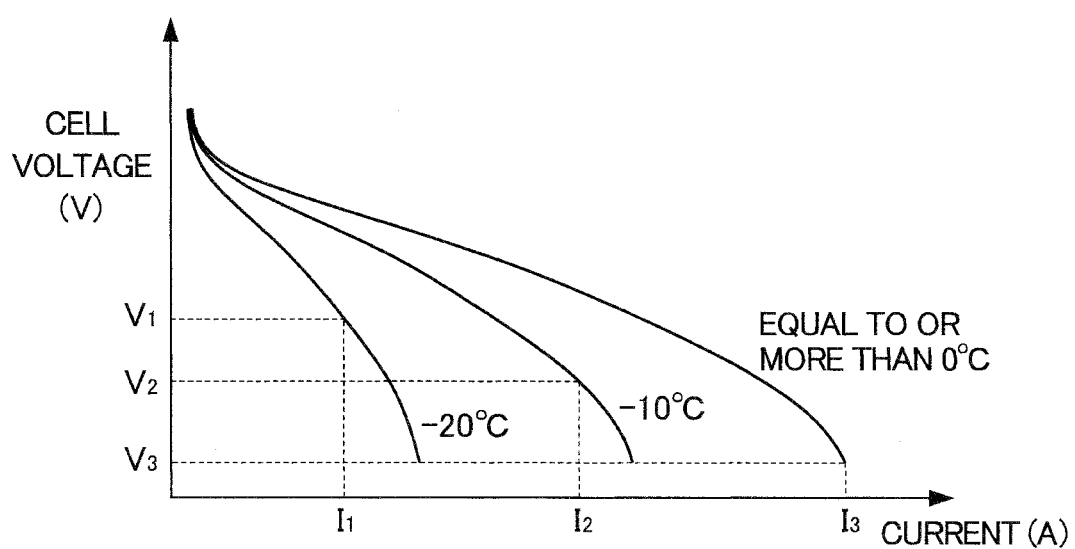
FIG. 4 is a diagram showing the current versus voltage characteristics at the temperature of the fuel cell of minus 20° C., minus 10° C. and equal to or higher than 0° C. in relation to the embodiment.

FIG. 4 shows the current versus voltage characteristics showing the cell voltage of the fuel cell 10 versus the output current in a case where the temperature of the fuel cell is minus 20° C., minus 10° C. and equal to or higher than 0° C. As is shown in FIG. 4, in a case where the output current increases, the voltage lower limit tends to decrease. Furthermore, the higher the temperature, the slower the degree of decrease of the voltage lower limit becomes due to the increase of the output current.

For example, in a case where the temperature of the fuel cell 10 is minus 20° C. and the output current is I1, the cell voltage becomes V1. Then, in a case where the temperature of the fuel cell 10 is minus 20° C., since the voltage lower limit is V1 according to FIG. 3, when the output current becomes higher than I1, the cell voltage becomes lower than the voltage lower limit V1, and therefore enters into the MEA degradation range so that the current I1 is determined as the current upper limit. Similarly, in a case where the temperature of the fuel cell 10 is minus 10° C. and the output current is I2, the cell voltage becomes V2. Then, in a case where the temperature of the fuel cell 10 is minus 10° C., since the voltage lower limit is V2 according to FIG. 3, when the output current exceeds I2, the cell voltage goes lower than the voltage lower limit V2, and therefore enters into the MEA degradation range so that the current I2 is determined as the current upper limit. In addition, in a case where the temperature of the fuel cell 10 is equal to or higher than the normal temperature, in a case where the output current is I3, the cell voltage becomes V3. Then, in a case where the temperature of the fuel cell 10 is equal to or higher than the normal temperature, since the voltage lower limit is V3 according to FIG. 3, when the output current becomes higher than I3, the cell voltage goes lower than the voltage lower limit V3, and therefore enters into the MEA degradation range so that the current I3 is determined as the current upper limit.

In a case where the current versus voltage characteristics at the temperature of the fuel cell 10 that is detected by the temperature sensor 103 is not stored, the current versus voltage characteristics at that detected temperature may be determined by interpolation using the current versus voltage characteristics at the nearest temperature of the fuel cell that is stored.

As is shown in FIG. 4, the current versus voltage characteristics of the fuel cell 10 demonstrates a similar curve despite of the temperature of the fuel cell 10. Therefore, by detecting the cell voltage while the current value is small, the current upper limit can be calculated by estimation of the current versus voltage characteristics based on a relation between that current value and the cell voltage.

Based on the cell voltage that is detected by the voltage sensor 102, in a case where the lowest cell voltage, that is the lowest value of each cell voltage, is lower than the voltage lower limit, the current limiting portion 33 inputs an instruction signal of the current control to the current limiter 13 in order to limit the output current to be lower than the current upper limit that is calculated by the current upper limit calculation portion 32.

In the embodiment of the present invention, the current is limited, but it is not limited to and the power can be limited.

By monitoring the output current at real time by the current sensor 101, the current value can be detected when the lowest cell voltage reaches the voltage lower limit, and this detected current value can be utilized as the current upper limit. According to this method, even when the current versus voltage characteristics is not known, the current limit value is reliably determined.

Consequently, as is shown in FIG. 3, in a case where the temperature of the fuel cell 10 is the normal temperature, the voltage lower limit is lower compared to the case where the temperature of the fuel cell 10 is in the lower temperature range. In addition, as is shown in FIG. 4, in a case where the temperature of the fuel cell 10 is the normal temperature, the voltage does not decrease practically, even in a case where the output current increases compared to the case where the temperature of the fuel cell 10 is in the lower temperature range.

Therefore, when the warming up period of the fuel cell 10 has been completed, the voltage lower limit becomes low, and even when the output current is made large, the possibility for the cell voltage to enter into the MEA degradation range becomes low so that it is effective to limit the current during the warming up period of the fuel cell 10. Accordingly, current limitation may be performed only during the warming up period of the fuel cell 10.

Figure 5:
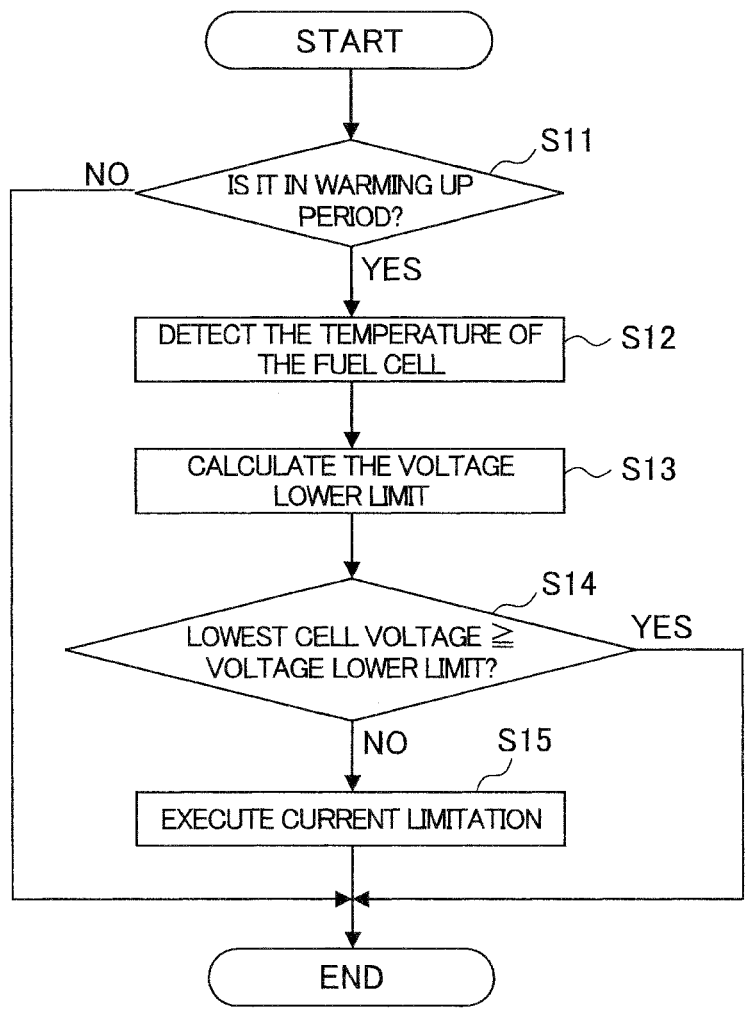
FIG. 5 is a flow chart showing the operation of the fuel system related to the embodiment.

FIG. 5 is a flow chart showing operation of the fuel cell system 1.

In S11, the control device 30 determines whether the fuel cell system 10 is in the warming up period or not. If the determination in S11 is YES, processing moves to S12 because the fuel cell 10 is in the low temperature status, and there is the possibility that the cell voltage cross into the MEA degradation range. On the other hand, if the determination in S11 is NO, the process is finished without performing current limitation because the temperature of the fuel cell 10 is high enough and the possibility is considered to be low that the cell voltage will cross into the MEA degradation range.

In S12, the temperature sensor 103 detects the temperature of the fuel cell 10. In S13, based on this detected temperature, the voltage lower limit calculation portion 31 calculates the voltage lower limit that can prevent the cell voltage from entering the MEA degradation range.

In S14, the current limit portion 33 acquires the lowest cell voltage among the detected cell voltage by the voltage sensor 102 as the lowest cell voltage, and determines whether this lowest cell voltage is equal to or more than the voltage lower limit calculated in S13 or not.

In a case where the determination in S14 is YES, the process is finished because the cell voltage is not in the range of MEA degradation and current limitation is not necessary. On the other hand, if the decision in S14 is NO, the current limiting portion 33 limits the output current to be lower than the current upper limit that is calculated by the upper current calculation portion 32 because the lowest cell voltage is in the MEA degradation range (S15).

According to the embodiment of the present invention, there are the following effects.

(1) As the voltage lower limit can be calculated according to the temperature characteristics related to MEA degradation, the performance degradation of the fuel cell 10 by the excessive limitation of the output current can be avoided. As a result, the discomfort arising from degradation in drivability can be avoided and the merchantability can be assured.

(2) As the voltage lower limit is calculated based on the temperature of the fuel cell 10, the cell voltage entering into the MEA degradation range can be prevented even when the temperature of the fuel cell 10 changes.

(3) The output current limiting value can be determined reliably since the output current limiting value is determined by the voltage lower limit according to the current versus voltage characteristics showing the relation between the output current and the cell voltage of the fuel cell 10.

(4) Since the voltage lower limit is calculated in the lower temperature range in which the voltage condition to suppress MEA degradation becomes severe as in the case of the warming up period, the processing load to limit the output can be reduced after the completion of warming up.

The Second Embodiment

In this embodiment, the configuration of the voltage lower limit calculation portion 31, the current upper limit calculation portion 32 and the current limiting portion 33 are different from those of the first embodiment. Specifically, in the first embodiment, the voltage lower limit is used as the threshold value in the current limiting portion 33, but in the second embodiment, the current upper limit is used as the threshold value in the current limiting portion 33.

More specifically, in the first embodiment, the voltage lower limit is calculated as the voltage threshold by the voltage lower limit calculation portion 31. Then, the current upper limit calculation portion 32 calculates the current upper limit based on the voltage lower limit that is calculated by the voltage lower limit calculation portion 31. Next, the current limiting portion 33 limits the output current to be lower than the current upper limit in order to keep the lowest cell voltage equal to or higher than the voltage lower limit by comparing the lowest cell voltage and the voltage lower limit.

On the other hand, in the present embodiment, the voltage lower limit calculation portion 31 calculates the voltage lower limit. Then, the current upper limit calculation portion 32 calculates the current upper limit as the current threshold value based on the voltage lower limit that is calculated by the voltage lower limit calculation portion 31. Next, the current limiting portion 33 limits the output current in order for the output current to be equal to or lower than the current upper limit by comparing the output current and the current upper limit.

FIG. 6 is a flow chart showing operation of the fuel cell system 1.

In S21, similar to the first embodiment, it is determined whether the fuel cell 10 is in the warming up period or not. In a case where the determination in S21 is YES, the process moves to S22, and in a case where the determination in S21 is NO, the process is finished.

In S22, the temperature sensor 103 detects the temperature of the fuel cell 10. In S23, based on this detected temperature, the voltage lower limit calculation portion 31 calculates the voltage lower limit that can prevent the cell voltage from entering into the MEA degradation range.

In S24, the current upper limit calculation portion 32 determines the current versus voltage characteristics at the detected temperature of the fuel cell 10. In S25, the current upper limit is calculated based on this current versus voltage characteristics.

In S26, the current limiting portion 33 determines whether the output current that is detected by the current sensor 101 is equal to or lower than the current upper limit that was calculated in S25. In a case where the determination in S26 is YES, the process is finished because the cell voltage is not in the range of MEA degradation, and current limitation is not necessary. On the other hand, if the determination in S26 is NO, the current limiting portion 33 limits the output current to be lower than the current upper limit because the lowest cell voltage is in the MEA degradation range (S27).

According to the embodiment of the present invention, there are the following effects.

(5) Since the current upper limit can be calculated according to the temperature characteristics related to MEA degradation, the performance degradation of the fuel cell 10 by excessive limitation of the output current can be avoided. As a result, the discomfort arising from degradation in drivability can be avoided and the merchantability can be assured.

(6) Since the current upper limit is calculated based on the temperature of the fuel cell 10, the cell voltage entering into the MEA degradation range can be prevented, even when the fuel cell temperature changes.

(7) Since the current upper limit is calculated from the voltage lower limit according to the current versus voltage characteristics, the output limiting timing can be determined by detecting the output current and monitoring variation thereof. Furthermore, the output current limiting value can be determined based on this current upper limit.

(8) Since the current upper limit is set in the lower temperature range in which the voltage condition to suppress the MEA degradation becomes severe as in the case of the warming up period, the processing load to limit the output can be reduced after warming up is completed.

The present invention is not intended to be limited by the above described embodiments, and the modifications and improvements within the scope to achieve the object of the present invention are included in the present invention.

What is claimed is:

1. A control method of a fuel cell that generates electric power by reaction of hydrogen gas and oxidant gas comprising steps of:
   detecting a temperature of the fuel cell;
   setting a voltage threshold value to limit output of the fuel cell based on the temperature detected; and
   limiting the output of the fuel cell in a case where generated voltage by the fuel cell is lower than the voltage threshold value,
   wherein the fuel cell generates electric power at 0° C. or lower,
   wherein in the setting step the voltage threshold value is decreased as the temperature of the fuel cell increases when the temperature is lower than 0° C., and is set to a constant value when the temperature is equal to or higher than 0° C.

2. The control method according to claim 1, wherein, in a case where limiting the output of the fuel cell, an output limiting value of the fuel cell is determined based on the voltage threshold value and current versus voltage characteristics showing a relation between the generated current and the generated voltage of the fuel cell.

3. The control method according to claim 2, wherein the voltage threshold value to limit the output of the fuel cell is set based on the temperature detected of the fuel cell during a warming up period of the fuel cell.

4. The control method according to claim 1, wherein the voltage threshold value to limit the output of the fuel cell is set based on the temperature detected of the fuel cell during a warming up period of the fuel cell.

5. A control method of a fuel cell that generates electric power by reaction of hydrogen gas and oxidant gas comprising steps of:
   detecting a temperature of the fuel cell;
   setting a current threshold value to limit output of the fuel cell based on the temperature detected; and
   limiting the output of the fuel cell in a case where generated current by the fuel cell is higher than the current threshold value, wherein:
   wherein the fuel cell generates electric power at 0° C. or lower,
   in the setting step the current threshold value is determined based on a voltage threshold value dependent on the temperature of the fuel cell and current versus voltage characteristics showing a relation between the generated current and the generated voltage of the fuel cell, the voltage threshold value is decreased as the temperature increases when the temperature is lower than 0° C. and is set to a constant value when the temperature is equal to or higher than 0° C.

6. The control method according to claim 5 wherein, in a case where limiting the output of the fuel cell, an output limiting value of the fuel cell is determined based on the current threshold value and current versus voltage characteristics showing a relation between the generated current and the generated voltage of the fuel cell.

7. The control method according to claim 6, wherein the current threshold value to limit the output of the fuel cell is set based on the temperature detected of the fuel cell during a warming up period of the fuel cell.

8. The control method according to claim 5, wherein the current threshold value to limit the output of the fuel cell is set based on the temperature detected of the fuel cell during a warming up period of the fuel cell.

* * * * *